United States Patent [19]

Bergquist et al.

[11] Patent Number: 5,130,156
[45] Date of Patent: Jul. 14, 1992

[54] METHOD FOR AGGLOMERATING FOOD POWDERS

[75] Inventors: Dwight H. Bergquist; Gary D. Lorimor; Thomas E. Wildy, all of Omaha, Nebr.

[73] Assignee: Henningsen Foods, Inc., White Plains, N.Y.

[21] Appl. No.: 742,372

[22] Filed: Aug. 8, 1991

Related U.S. Application Data

[62] Division of Ser. No. 465,461, Jan. 16, 1990, Pat. No. 5,069,118.

[51] Int. Cl.[5] .............................................. A23C 9/00
[52] U.S. Cl. ..................................... 426/453; 426/285; 426/467
[58] Field of Search ............... 426/453, 285, 467, 471; 99/471, 474, 483, 516

[56] References Cited

U.S. PATENT DOCUMENTS 2,897,084  7/1959  Peebles ............................. 426/453
3,966,975  6/1976  Hansen et al. ..................... 426/285

Primary Examiner—George Yeung
Attorney, Agent, or Firm—Joseph J. Previto

[57] ABSTRACT

A spray drying mechanism for agglomerating food powders in which a standard spray dryer having a drying chamber is used. Spray nozzles extend into the drying chamber and are supplied with an agglomerating medium which the spray nozzles spray into the drying chamber. Powdered food supplying mechanism is provided for directing the powdered food against the agglomerating medium being sprayed from the spray nozzle into the drying chamber in order to agglomerate the powdered food. The agglomerating medium is sprayed in the drying chamber in a cone-shape configuration and the powdered food is directed against the cone-shaped configuration of the agglomerating medium.

5 Claims, 2 Drawing Sheets

METHOD FOR AGGLOMERATING FOOD POWDERS

This application is a division of pending U.S. application Ser. No. 07/465,461 filed Jan. 16, 1990, now U.S. Pat. No. 5,069,118.

BACKGROUND

The present invention relates to spray drying of food powders and more particularly to an improved mechanism and method for spray drying of food powders which results in agglomeration of the dried food powders.

Many spray dried food powders do not disperse readily in water. They may also be dusty and not very free-flowing. Agglomeration of dried food powders is a means for giving the product good dispersing and dissolving properties, making the product free-flowing and reducing its dustiness. It has been found that conventional agglomerating procedures produce a considerable number of fine powder which must be sifted away from the agglomerates. Moreover, the agglomerated food powders formed are not of a uniform size. In addition, a number of oversized particles are produced by existing mechanism which must be removed and separated from the particles by a screen or some other means.

In several different kinds of existing agglomeration equipment, a two-step procedure is usually required whereby the powders are wetted in order to agglomerate the particles, and then the wetted particles are dried in separate equipment to the desired moisture level. Production of a higher percentage of oversized material and fine powder is the result of such procedures. These agglomerating procedures which use a one-step process, for example in a spray dryer, do not mix the powder with the agglomerating liquid sufficiently enough to give uniform sized agglomerates. In addition, too much fine powder, as well as too many coarse materials, are produced by such procedures.

U.S. Pat. No. 3,621,902 shows hot air being blown against a spray of milk foam ejected from a nozzle which surrounds the spray nozzle. It is believed that the purpose is to produce powdered milk without any burnt particles. U.S. Pat. No. 4,640,839 shows an agglomeration process in which a powdered water-soluble material is agglomerated by projecting the material in a stream through a moistening zone and directing steam through it. U.S. Pat. No. 3,700,461 shows an agglomerator in which the material is wetted and suspended in a gaseous medium. U.S. Pat. No. 3,584,097 shows powder subjected to an upwardly flowing pulsating air stream and injected with a liquid binder. U.S. Pat. No. 4,042,653 shows an agglomerating process in which atomized droplets are dried and sprayed with a fluid binder. None of these prior patents disclose the invention which is disclosed and claimed herein.

BRIEF DESCRIPTION OF THE INVENTION

The present invention avoids these drawbacks and has for one of its objects the provision of an improved mechanism and method of spray drying food powders in which spray dried powders can be easily and inexpensively agglomerated with existing conventional spray drying equipment.

Another object of the present invention is the provision of an improved mechanism and method of spray drying food powders in which the spray dried powders are agglomerated in a single step.

Another object of the present invention is the provision of an improved mechanism and method of spray drying food powders which results in dry agglomerations which are of uniform size.

Another object of the present invention is the provision of an improved mechanism and method and method of spray drying food powders in which the agglomerations formed contain a little, if any, fine powder.

Another object of the present invention is the provision of an improved mechanism and method of spray drying food powders in which the agglomerations produced do not contain any oversize material.

Other and further objects of the invention will be obvious upon an understanding of the illustrative embodiment about to be described, or will be indicated in the appended claims and various advantages not referred to herein will occur to one skilled in the art upon employment of the invention in practice.

The improved mechanism and method of the present invention utilizes the dry powder feed tubes that surround the agglomerating liquid piping to the nozzle to prevent the liquid from being overheated when passing through the plenum. The dry product is conveyed through the feed tubes into the drying chamber between the space created by the liquid nozzle piping and the dry food tube around this piping.

DESCRIPTION OF THE DRAWING

A preferred embodiment of the invention has been chosen for purposes of illustration and description and is shown in the accompanying drawings forming a part of the specification, wherein.

DESCRIPTION OF THE INVENTION

Figure 1:
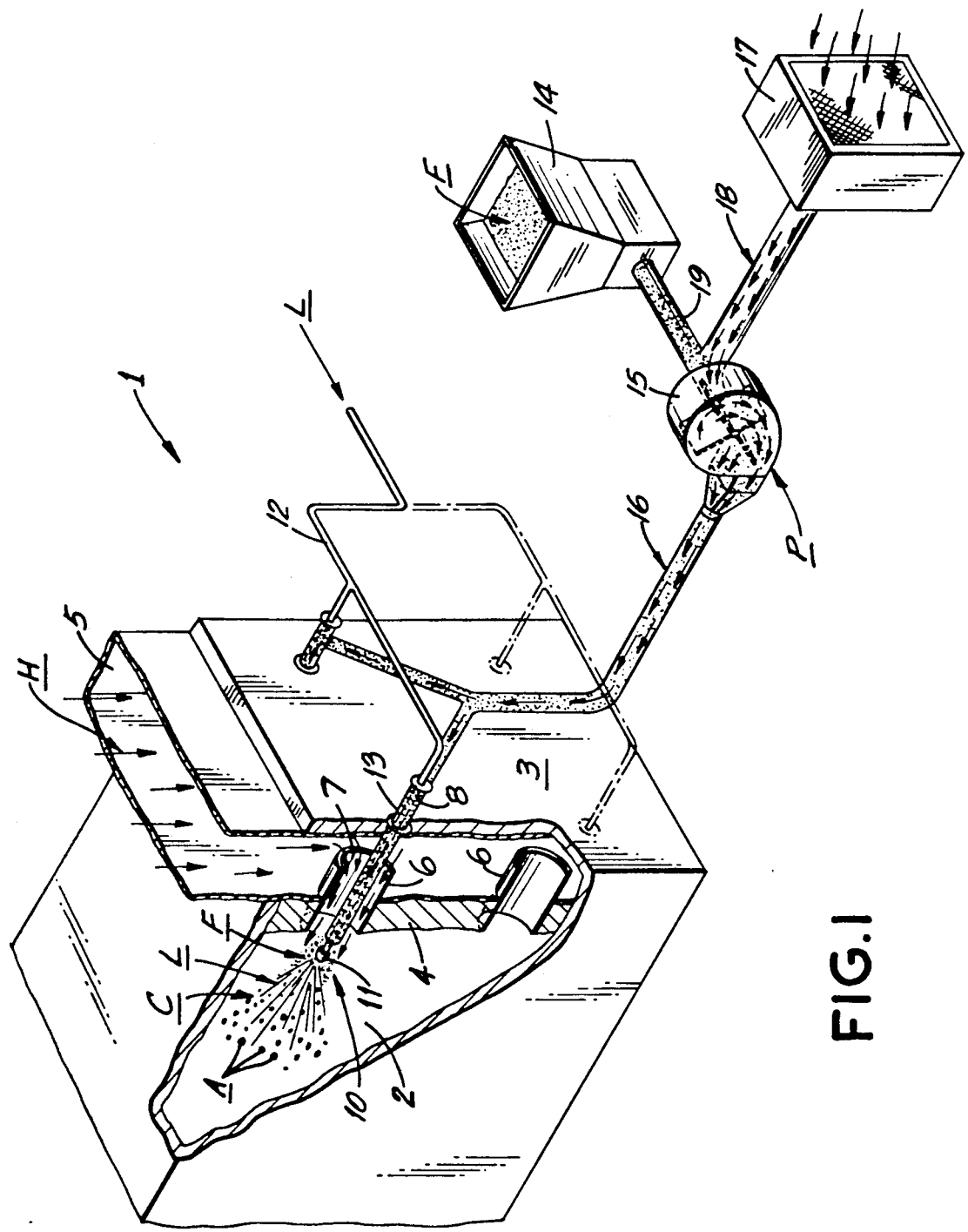
FIG. 1 is a schematic perspective view showing the spray drying equipment embodying the present invention.

Referring to the drawings, and more particularly to FIG. 1, a spray dryer assembly 1, which may be a conventional spray dryer, comprises a drying chamber 2, an outer wall 3 and an inner wall 4 spaced inwardly from an outer wall 3 to form a plenum chamber 5 between walls 3 and 4. As is usual in such spray dryers, the plenum chamber 5 is adapted to have hot air H drawn therewithin. Mounted on and extending through the inner wall 4 are a plurality of plenum tubes 6 connecting the plenum chamber 5 to the drying chamber 2 so that hot air H moves from the plenum 5 into the drying chamber 2.

Figure 2:
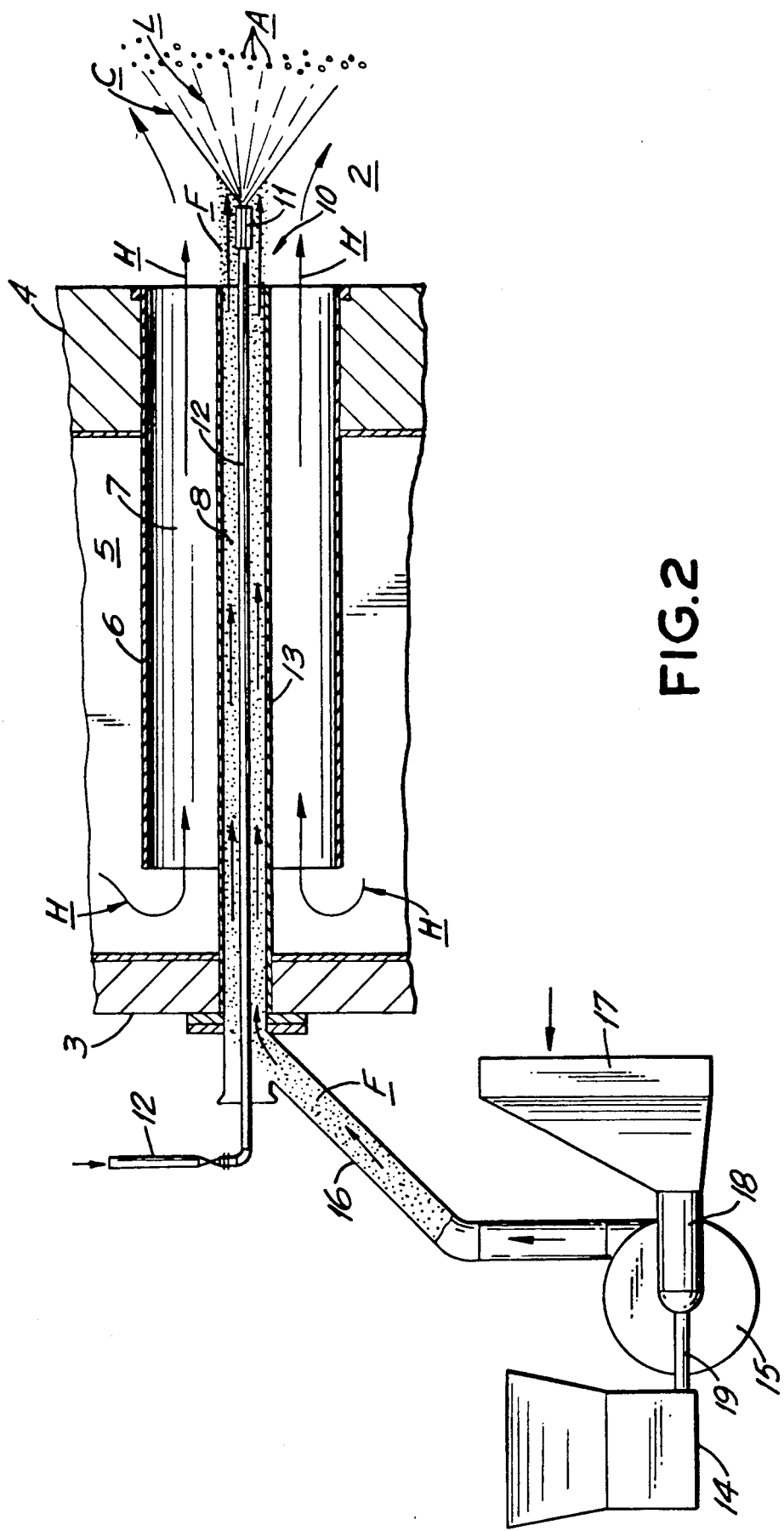
FIG. 2 is a schematic view showing the details of the spray drying equipment which is the subject matter of the present invention.

A spray drying nozzle assembly 10 is mounted within and spaced from the plenum tube 6 to leave a passageway 7 through which the hot air H can move from the plenum to the inner drying chamber 2. Each spray drying nozzle assembly 10 comprises a spray drying nozzle 11 mounted at the forward end of an agglomerating liquid feed pipe 12 and a powdered food tube 13 surrounding the pipe 12. The nozzle 11 is so designed to spray the agglomerating liquid L sprays out into the drying chamber 2 in a cone-shaped configuration C as best illustrated in FIG. 2. The nozzle 11 receives agglomerating liquid L from an agglomerating liquid feed pipe 12 which extends within and through the powdered food tube 13 in spaced relationship thereto to form a space 8 through which the powdered food F moves.

The powdered food tube 13 terminates short of the nozzle 11 and is adapted to convey the powdered food F from a feeder 14 to the powdered food tube 13 by means of a blower 15 and conduit pipes 16 and 19. The blower 15 receives air from a source through a filter 17 and the air pipe 18. The blower 15 receives powdered food F from feeder 14 through piping 19. The air mixes with the powdered food F and is directed through the food tube 13 and into the drying chamber 2 and into contact with the cone-shape configuration C formed by the agglomeration liquid L where it mixes therewith to form agglomerations A.

Preferably, the powdered food piping 16 is split so that powdered food F enters the drying chamber 2 in a plurality of locations through a plurality of food tubes 13. The agglomerating liquid pipe 12 is also split in a similar manner so that it enters the drying chamber 2 through nozzles 11 in a plurality of locations together with the food conduit tubes 13.

Existing spray dryers usually have multiples of 4, 6, etc. nozzles. In the drawing, the spray dryer 1 is shown as being a 4 nozzle spray dryer. Two upper nozzles 11 (and associated piping and plenum tubes) are located near the top of the spray dryer 1 and two lower nozzles would normally be located below the upper nozzles 11 near the bottom of the dryer. In FIG. 1 of the drawing two lower nozzles are shown as having been removed and the places where they would go through the outer wall 3 of the dryer are shown in broken lines. While the lower nozzles have been removed (or have been inactivated), the inner plenum tubes 6 remain in place in the plenum wall 4 so that hot air H can move from the plenum 5 into the spray dryer chamber 2 through all of the plenum tubes 6, i.e., both the upper ones with the spray nozzles therein and the lower ones without the spray nozzles. This permits the agglomerated particles A which drift down after agglomeration to pass through the hot air being ejected into the inner chamber 2 from the lower plenum tubes 6 before settling on a collection station at the bottom of the inner drying chamber 2. If desired, the lower spray nozzles may be left in place and be merely turned off (without being physically removed) so that although they are drying, hot air H will still flow through both the upper and lower plenum tubes 6 into the drying chamber 2.

As set forth above, the dry powdered food F to be agglomerated is deposited into the feeder 15 which feeds the material at a uniform rate into a pneumatic conveying system P comprising the conduits 18, 19 and 16 as well as the blower 15. The air for this pneumatic conveyor system P is first filtered by a filter 17 before it picks up the powdered food F from conduit 18 at the inlet of the blower 15. The blower 15 tends to mix the powdered food F uniformly with the air, conveying it through the blower 15 into pipe 16 leading to the food tube 13 surrounding the agglomerating liquid piping 12. Powdered food F is thus introduced to the drying chamber 2 behind each spray nozzle 11. The velocity of the powdered food F coming into the drying chamber 2 is high enough to cause impingement of powdered food F onto the back of the spray of agglomerating liquid L in the area of the hollow cone C formed by the agglomerating liquid L before the spray breaks into fine particles and dries. Thus, the particles of food powder F introduced into the dryer 2 are wetted and come together with agglomerating liquid particles L while within the hollow cone area C of the agglomerating liquid spray L which then break up and form uniformly sized agglomerates A.

The hot air stream H enters the drying chamber 2 from the plenum 5 through the spaces 7 in the plenum tubes 6 thereby drying the agglomerated particles A very rapidly. The agglomerated particles A are dried in the drying chamber 2 to the desired moisture level by controlling the inlet and outlet temperatures of the spray drying chamber 2, the rate at which the agglomerating liquid L is fed to the drying chamber 2 and the rate at which the feed powder F is fed to the drying chamber 2. The agglomerated dried product A formed in the drying chamber 2 drifts to the bottom and is then collected and removed by any known powder removal system (not shown).

It has been determined that air velocity of about 6,500 ft. per minute (73 miles per hour or 108 ft. per second) is the preferred velocity to convey the powdered food F through the annular spaces 8 of the powdered food tube 13 in order to obtain the preferred agglomerated particles A. Somewhat lower or higher velocities can be used, depending on the food product which is being agglomerated.

If a multiple nozzle dryer is used, splitting the pneumatic system P carrying the air/food powder F into a plurality of streams is desired so that each nozzle 11 is fed substantially the same quantities at substantially the same rate. FIG. 1 shows a spray dryer which can be used as a four-nozzle dryer or as a dryer with less than four nozzles. The pneumatic air/food stream F is split into two streams when feeding the two upper nozzles of the four-nozzle dryer. However, the two lower nozzles are not used but are removed or somehow shut off. In the drawing they are shown removed and broken lines indicate where they would have been located. However, hot air H is allowed to pass from the plenum chamber 5 through the bottom plenum tubes 6 (without nozzles or food tubes) and into the drying chamber 2. This creates a hot air cushion below the agglomerating cones C through which the agglomerated particles A must pass as they drift downward before reaching the bottom of the drying chamber 2. This assures drying of the agglomerated food particles A to a proper moisture level. It has been found that this same principle may also be used on a 6-nozzle spray dryer where only the upper 3 nozzles are used for spray drying.

Pneumatic conveying air from the pneumatic system P can come from the room and be introduced into the system without heating, or it can be either heated or cooled, whichever is necessary to give the best product. The air is supplied to the system by the high pressure blower 15 which delivers the proper amount of air at the proper pressure. The powdered food F is fed from the feeder 14 located near the inlet to the blower 15 and which is preferably a variable speed, constant rate feeder, such as a volumetric feeder. Air is filtered through a high efficiency air filtering unit 17 before going to the blower 15.

Various liquids can be sprayed into the drying chamber 2 to serve as the agglomerating liquid L. For example, water may be used as well as any combination of liquids that would act as a carrier for the agglomerated material. In many cases, the liquid which is being spray dried can itself be used as the agglomerating liquid L.

The size of the aggromerates A can be controlled by adjusting the powder rate to the system, i.e., the rate at which the powdered food F is being fed to the system. For example, a high powder rate would give a larger particle size agglomerate than a low powder rate. Furthermore, the rate at which the agglomerating liquid L is fed to the spray nozzle can be controlled to permit production of agglomerate particles A of various sizes. Higher liquid rates result in smaller particles, while lower liquid rates result in larger particles.

An example of a product that was agglomerated and dried by this method was a 30% solids nutrient drink material which consisted mainly of carbohydrates and protein. This material was quite hydroscopic and had a tendency to cake and even become wet when left exposed to the room atmosphere. This material was successfully spray dried into a fine powder and agglomerated by the system described above.

A standard 6-nozzle spray dryer was used utilizing only the top three nozzles in the spray dryer. The powdered food tubes (through which the food powder was conveyed into the drying chamber) surrounding agglomerating liquid feed piping to the nozzles was a 2 inch O.D. S/S tubing with a 1.87" I.D. The feed rate was set at 500 lbs. of food powder per hour, the same rate as the powder produced by the dryer i.e. 1650 lbs. liquid per hour, yielding 500 lbs. powder per hour. Total production rate of agglomerated powder was thus 1,000 lbs. per hour. Little change in moisture level was noted as the machinery was switched from spray dried product to agglomerated product. The dryer was first started with spray drying of the food product with the moisture adjusted to the desired level. The food product was introduced into the dryer through the nozzle tubes and the pneumatic system described above. The spray dryer was a Size 1500 Gentle Air Spray Dryer with 6 nozzles (using only the top 3 nozzles in this case) merely allowing the hot air from the plenum to go through the bottom 3 plenum tubes without any spraying action. By this procedure, a uniform particle size of 200–300 microdiameter agglomerates was obtained which had good dispersing properties when added to water.

It will thus be seen that agglomeration of spray dried products is accomplished by impinging high velocity particles of powdered food against the backside of the cone of agglomerating liquid spray. The powder strikes the liquid spray in the hollow cone section of the spray before the spray breaks into particles and becomes dry. In order to get good sticking of the particles onto the liquid spray, the air and powder should move at a high velocity. The mixture of spray and powder break into agglomerates which dry in the hot air stream of the inlet drying air. In addition, there are numerous materials which can be agglomerated in this manner and numerous combinations of agglomerates which can be used as the agglomerating material.

It will thus be seen that the present invention provides an improved mechanism and method of spray drying food powders in which spray dried powders can be easily and inexpensively agglomerated with existing conventional spray drying equipment in a single step in which the dry agglomerations are of uniform size, contain a little, if any fine powder and do not contain any oversize material.

As many and varied modifications of the subject matter of this invention will become apparent to those skilled in the art from the detailed description given hereinabove, it will be understood that the present invention is limited only as provided in the claims appended hereto.

The embodiments of the invention which an exclusive property or privilege is claimed are defined as follows:

1. A method of agglomerating powdered food in a drying chamber, comprising spraying an agglomerating medium in the drying chamber, directing powdered food into the drying chamber, impinging the powdered food against the agglomerating medium as the agglomerating medium is being sprayed into the drying chamber in order to agglomerate the powdered food, said agglomerating medium being sprayed into the drying chamber in a cone-shape configuration, said powdered food being impinged against the cone-shaped configuration of the agglomerating medium, the said powdered food being impinged against the rear of the cone-shaped configuration of the agglomerating medium, the powdered food moving in a path surrounding the path of the agglomerating medium before each is directed in the drying chamber, hot air being directed into the drying chamber and the hot air moving in a path surrounding the path of the powdered food before each is directed into the drying chamber.

2. The method as set forth in claim 1 wherein said agglomerating medium is a liquid.

3. The method as set forth in claim 2 wherein hot air is supplied to the drying chamber in the path of the agglomerated powdered food after being agglomerated.

4. The method as set forth in claim 3 wherein said powdered food is mixed with air before being directed to the drying chamber.

5. The method as set forth in claim 4 wherein the powder rate is adjustable to control the size of the agglomerates formed and wherein the size of the agglomerates formed is substantially proportional to the powder rate.

* * * * *